United States Patent
Sadwick et al.

(10) Patent No.: US 8,791,655 B2
(45) Date of Patent: Jul. 29, 2014

(54) LED LAMP WITH REMOTE CONTROL

(75) Inventors: Laurence P. Sadwick, Salt Lake City, UT (US); William B. Sackett, Sandy, UT (US)

(73) Assignee: InnoSys, Inc., Salt Lake City, UT (US)

( * ) Notice: Subject to any disclaimer, the term of this patent is extended or adjusted under 35 U.S.C. 154(b) by 179 days.

(21) Appl. No.: 12/776,409

(22) Filed: May 9, 2010

(65) Prior Publication Data

US 2011/0204778 A1    Aug. 25, 2011

Related U.S. Application Data

(60) Provisional application No. 61/176,890, filed on May 9, 2009.

(51) Int. Cl.
*G05F 1/00* (2006.01)

(52) U.S. Cl.
USPC ............. 315/309; 315/50; 315/117; 315/118; 315/34

(58) Field of Classification Search
USPC ............... 315/34–35, 50, 117–118, 291, 294, 315/307–309, 311
See application file for complete search history.

(56) References Cited

U.S. PATENT DOCUMENTS

| | | | |
|---|---|---|---|
| 2002/0047631 A1* | 4/2002 | Pederson | 315/291 |
| 2003/0137258 A1* | 7/2003 | Piepgras et al. | 315/291 |
| 2003/0222603 A1* | 12/2003 | Mogilner et al. | 315/294 |
| 2005/0047134 A1* | 3/2005 | Mueller et al. | 362/231 |
| 2005/0285547 A1* | 12/2005 | Piepgras et al. | 315/294 |
| 2007/0145915 A1* | 6/2007 | Roberge et al. | 315/312 |
| 2009/0079357 A1* | 3/2009 | Shteynberg et al. | 315/291 |
| 2012/0235585 A1* | 9/2012 | Lys et al. | 315/200 R |

* cited by examiner

*Primary Examiner* — Jason M Crawford
(74) *Attorney, Agent, or Firm* — Hamilton DeSanctis & Cha

(57) ABSTRACT

Various apparatuses and methods are disclosed for a remotely controllable LED lamp. One embodiment of an LED lamp includes at least one LED in each of a plurality of colors, a power supply, and a controller connected to the power supply and the at least one LED in each of a plurality of colors. The controller is adapted to adjust current levels to the at least one LED in each of a plurality of colors to produce a blended color. The controller is also adapted to adjustably vary an intensity of the blended color without substantially changing the blended color.

18 Claims, 4 Drawing Sheets

LED LAMP WITH REMOTE CONTROL

CROSS REFERENCE TO RELATED APPLICATIONS

The present application claims priority to U.S. Patent Application No. 61/176,890 entitled "LED Lamp with Remote Control", filed May 9, 2009, the entirety of which is incorporated herein by reference for all purposes.

BACKGROUND

Interest has grown rapidly in replacing incandescent lights with more efficient lighting, such as fluorescent lighting and light emitting diodes (LEDs). However, the different power requirements for these various types of lighting generally require additional circuitry to transform the typical line voltage provided to incandescent light fixtures. Furthermore, fitting a replacement LED into standard incandescent form factors such as recessed can light fixtures presents difficulties in configuration of replacement lamps, heat dissipation, and shielding of control signals.

SUMMARY

An LED lamp is disclosed, with various embodiments providing remote control of dimming levels and color levels. Some embodiments provide remote status feedback. Some embodiments may be used in existing can light fixtures and provide an antenna for remote control to compensate for shielding in metal can light fixtures. It should be noted and understood that the term LED applies to any type or form of light emitting solid state devices including but not limited to light emitting diodes made from semiconductor materials including III-V materials such as gallium arsenide (GaAs)-based, gallium phosphide (GaP)- and gallium nitride (GaN)-based materials and material systems and also, for example, organic light emitting diodes (OLEDs) made, for example, from molecules.

One embodiment of an LED lamp includes at least one LED in each of a plurality of colors, a power supply, and a controller connected to the power supply and the at least one LED in each of a plurality of colors. The controller is adapted to adjust current levels to the at least one LED in each of the plurality of colors to produce a blended color. The controller is also adapted to adjustably vary an intensity of the blended color without substantially changing the blended color.

An embodiment of the lighting apparatus also includes a wireless transceiver. The controller is adapted to receive a user color selection and a user dimming level selection through the wireless transceiver. The blended color is based on the user color selection and the intensity is based on the user dimming level selection.

In an embodiment of the lighting apparatus, the controller is further adapted to vary the intensity based on an power level to the power supply as set by an external dimmer.

In an embodiment of the lighting apparatus the power supply, the controller and the at least one LED in each of the plurality of colors is adapted for use in a recessed can light fixture.

An embodiment of the lighting apparatus also includes an antenna connected to the wireless transceiver.

In an embodiment of the lighting apparatus the power supply, the controller and the at least one LED in each of the plurality of colors is housed in a lamp with a form factor such as E26, E27, PAR 20, PAR 30, and PAR 38.

In an embodiment of the lighting apparatus, the lamp includes a heat sink.

In an embodiment of the lighting apparatus, the power supply comprises an AC/DC converter adapted to convert an AC line voltage to a lower voltage constant current DC output.

In an embodiment of the lighting apparatus, the blended color is maintained during intensity adjustment by substantially maintaining a ratio between the current levels to the at least one LED in each of the plurality of colors.

An embodiment of the lighting apparatus also includes a light sensor or sensors, and the blended color is maintained during intensity adjustment based on feedback from the light sensor or sensors.

An embodiment of the lighting apparatus also includes a light sensor(s), and the controller is adapted to vary the intensity based at least in part on a measurement from the light sensor(s) to maintain a user selected illumination level.

In an embodiment of the lighting apparatus, the controller is adapted to select one of a number of control inputs from which to accept a user color selection and a user dimming level selection, including a wireless data link and/or a power line data link.

An embodiment of the lighting apparatus also includes a microphone. The controller is adapted to receive audio input from the microphone. The blended color and the intensity are based at least in part on the audio input.

An embodiment of the lighting apparatus also includes a temperature sensor. The controller is adapted to receive temperature data from the temperature sensor and to base the blended color, the intensity, and the output power and current at least in part on the temperature data.

In an embodiment of the lighting apparatus, the controller is adapted to operate in cooperation with other controllers.

In an embodiment of the lighting apparatus, the controller includes a number of digital to analog converters adapted to set the current levels.

Other embodiments provide a method of controlling an LED lamp. The method includes adjusting a current level to each of a number of groups of LEDs based on a user color selection. Each group of LEDs has a different color. The current levels are adjusted to produce a blended color identified by the user color selection. The method also includes adjusting the current level to each of the groups of LEDs based on a user dimming input to produce an output intensity identified identified and selected by the user dimming input while substantially maintaining the blended color.

An embodiment of the method also includes receiving the user color selection and the user dimming input from a wireless remote control.

An embodiment of the method also includes receiving the user color selection and the user dimming input over a power line data link.

An embodiment of the method also includes transmitting a status of the current level to each of the plurality of groups of LEDs to a remote interface.

BRIEF DESCRIPTION OF THE DRAWINGS

A further understanding of the various embodiments may be realized by reference to the figures which are described in remaining portions of the specification. In the figures, like reference numerals may be used throughout several drawings to refer to similar components.

DESCRIPTION

Figure 1:
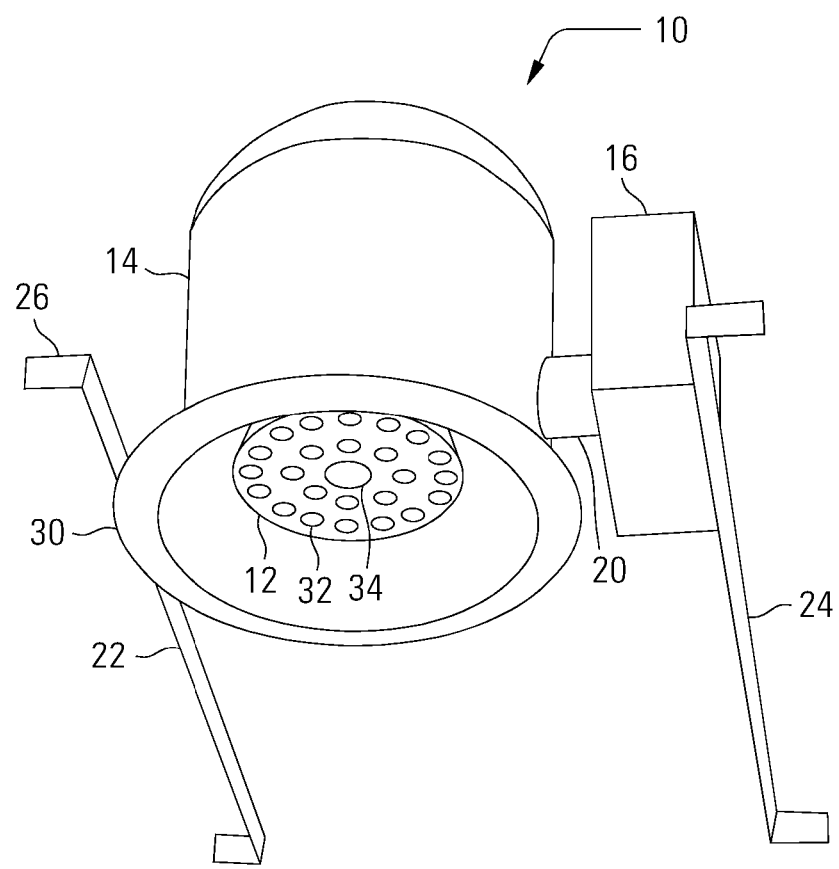
FIG. 1 depicts a can light fixture with a remotely controllable LED lamp.

The drawings and description, in general, disclose various embodiments of an LED lamp with remote control. An example of an LED lamp with remote control is illustrated in FIG. 1, as it may be used in a can light fixture 10. The LED lamp 12 is screwed or otherwise connected into the housing 14 of the can light 10. Although the LED lamp 12 may be used in any light fixture, and the can light fixture 10 is not limited to any particular configuration, an example of a suitable can light fixture 10 includes a cylindrical housing 14 to contain the LED lamp 12 and an electrical box 16 to house wire connections or other circuitry as desired. The electrical box 16 may have a connection 20 to the housing 14 to carry electrical wires to power the LED lamp 12. A pair of mounting arms 22 and 24 may be provided to span between joists in a ceiling to support the can light fixture 10, with tabs (e.g., 26) at the ends of the mounting arms 22 and 24 through which fasteners such as screws or nails may be driven into ceiling joists. A decorative bezel 30 may be used around the bottom of the can light fixture 10 to cover any gaps in the ceiling around the mouth of the can light fixture 10 and may also be used, if needed, to diffuse the light emitted from the LEDs.

The LED lamp 12 may include one or more LEDs (e.g., 32) and may be arranged in any number, configuration, and surface topology. For example, a single high intensity LED or a small number of high intensity LEDs may be used, or a larger number of lower intensity LEDs may be used to provide the desired light output. LEDs with different or varied light angular distribuitrions may be used. In some embodiments, the LED lamp 12 is dimmable to provide controllable light output, from bright to muted intensity. In some embodiments, the color of the light provided by the LED lamp 12 may be controlled. The control of these types of features of the LED lamp 12 may be performed in any suitable manner, such as by a wired control interface such as a conventional wall dimmer or a power line data link, or a wireless control interface, whether by radio frequency (RF), infrared (IR), or any other suitable interface. For wireless control of the LED lamp 12 when used in a metal can light fixture 10, an antenna 34 may be provided in any suitable location on the LED lamp 12 so that wireless control signals are not blocked or shielded by the metal can light fixture 10. For example, the antenna 34 may be positioned at or extend to the illuminating surface of the LED lamp 12 near the LEDs (e.g., 32) in any location, such as the middle or around the edge or in any other location, examples including through openings in the can either on the sides of the can light or through the bottom opening of the can. The LEDs may be positioned most anywhere in the can, depending on the application and associated details, including recessed from the bottom opening of the can.

Figure 2:
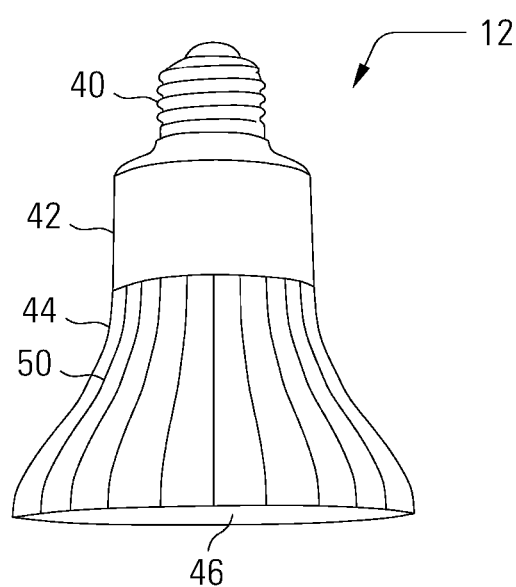
FIG. 2 depicts an LED spotlight lamp with heat dissipating fins that may be used for example in the can light fixture of FIG. 1.

Turning to FIG. 2, an example of the LED lamp 12 is illustrated, including a lamp base 40 that may be screwed into an electrically conductive socket in the can light fixture 10, a circuit housing 42 in which control circuitry is housed, including, for example, power conversion circuitry, dimming control circuitry, wireless interface circuitry, color control circuitry, etc. Another portion 44 of the LED lamp 12 may be used to carry wiring or circuit boards between the control circuitry in the circuit housing 42 and LEDs on an illuminating surface 46 of the LED lamp 12. Heat dissipating fins (e.g., 50) or a heat sink may be provided here or in any other suitable location on the LED lamp 12 to dissipate heat produced by the control circuitry in the circuit housing 42 or by the LEDs. Heat may also be dissipated by/from the LED lamp 12 through the can light fixture 10, through the lamp base 40 or any other thermal connection between the LED lamp 12 and the can light fixture 10. The shape of the LED lamp 12 may be similar to existing types of lamps, as with the spotlight replacement LED lamp 12 of FIG. 2, or may have any other desired form. For example, the LED lamp 12 may have a standard form factor such as an Edison E26 or E27 or a PAR 20, PAR 30, PAR 38 or other form factor.

Figure 3:
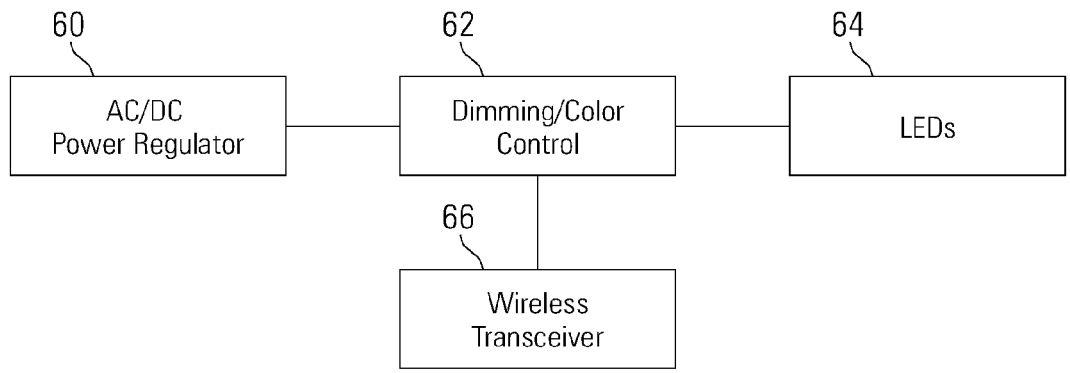
FIG. 3 depicts a block diagram of a remotely controllable LED lamp.

Turning now to FIG. 3, a block diagram of an example of an LED lamp 12 is illustrated. The LED lamp 12 may include AC/DC power regulation circuitry 60 to process the typical line voltage to meet the voltage and current requirements of the LED lamp 12. For example, the 110V/120V AC line voltage may be converted to a lower voltage constant current DC output(s) for the LEDs (e.g., 32) and control circuitry. The LED lamp 12 may also include dimming and color control circuitry 62 as desired to control the intensity and color of the light from the LED lamp 12. The LED lamp 12 may include one or more LEDs 64 of any type desired. The LED lamp 12 may also include a wireless transceiver 66 to receive wireless control signals and to transit status information as desired to an external controller.

Some embodiments of the LED lamp 12 may support multiple sources of dimming or color control, including wired from a wall based knob, switch or other controller including, for example, a standard triac dimmer, and wireless such as with a portable and remote RF controller or any combination of such control. The wireless controller may be adapted for temporary or permanent mounting on a wall if desired, and may include a power source such as a battery, either replaceable or rechargeable or other forms of power including wall plug power or even solar, thermal or mechanical vibration energy and power. The circuitry may also be designed to achieve high power factor and may also be designed to protect LEDs from over voltage input and output conditions by limiting the current while still retaining a high power factor. The circuitry may also be designed to switch or change from dimming mode in an automatic or manual fashion to an universal power supply mode with either constant current or constant voltage once a prescribed set of conditions exist, for example, an input voltage, average or peak, or both, is greater than a prescribed, predetermined, set, and other set of conditions, etc. level.

The dimming circuitry 62 in the LED lamp 12 may include circuitry to prevent flickering at low power levels by turning off the power to the LEDs (e.g., 32) when the dimmer is set to very low levels or by having circuits designed to compensate for variations in the input encountered at low power levels.

The color of the light output from the LED lamp 12 may be controlled, for example, using a combination of red, blue and green LEDs (e.g., 34) in the LED lamp 12, or any other combination of LEDs with different output characteristics or colors, or number of colors, to provide for color or white temperature adjustment. This provides, in some embodiments, a wirelessly controllable LED lamp 12 that may be used with existing recessed lighting fixtures such as can light fixtures 10, and from which the color or temperature of the light can be adjusted as desired, with either wired or wireless control or both. The LED lamp 12 may be dimmed while maintaining the selected color. For example, in an embodiment based on a red-green-blue (RGB) color system, the ratios between red, green and blue can be determined in the color selected by the user, and a controller in the LED lamp 12 maintains percentages or ratios between the current to the LEDs of different colors. The same RGB color selection of 96, 128, 96 could be dimmed down to 48, 64, 48 to decrease the overall light intensity of the blended color light while maintaining the selected color. In another embodiment, the selected color is maintained using a light sensor(s) in the LED lamp 12 which compares the sensed color levels in the output light with the selected color levels. In another example using an RGB color system, the sensor is adapted to produce an output giving the intensity of red, green and blue light from the LED lamp 12. The controller in the LED lamp 12 calculates the ratios between sensed red, green and blue light, and adjusts them as the LED lamp 12 is dimmed to ensure that the ratios between colors in the output light substantially match the user-selected color ratios. (It is important to note that the LED lamp 12 may be used in color systems other than the RGB examples discussed above.) The term "blended color" as used herein is not limited to a color that requires a contribution from every color of LED in the LED lamp 12. For example, the blended color that best matches the user selected color may be made up solely of light from one color of LED. In another example, the LED lamp 12 may include white LEDs as well as colored LEDs, and if the user selects white light and only the white LEDs are turned on, the output may still be referred to as blended light as the term is used herein. Thus, the present invention, in certain configurations, can perform the functions described herein and operate as either a white light source or a colored light source or both. When using white LEDs, the correlated color temperature (CCT) and the color rendering index (CRI) may be chosen, if desired, to meet specific and/or particular needs and applications or may be selected or chosen by the user.

Lights may be easily adjusted to set the desired mood, adjust the light based on ambient light conditions, or based on holidays or other events. The light intensity and color may be adjusted with continuously varying controllers, such as knobs, slides, up and down buttons, numeric keypads, voice commands, remote controls in general, etc, and may also be adjusted according to preset selections as desired. Such adjustments and control settings, etc. may be stored and recalled for further use. The number of such adjustments and control settings, etc. that may be stored can effectively be huge and limitless. A vast and diverse number of methods, approaches, ways, and implementations may be used to store and retrieve such information and settings, etc.

Ambient light conditions and/or light output from the LED lamp 12 may also be measured in the LED lamp 12 using light sensitive sensors such as photodiodes, phototransistors, a light meter, a spectrometer, etc. The measured levels may be transmitted from the LED lamp 12 to provide feedback to the user via the wired or wireless controller or any other interface. The measured levels may also be used to set the desired light output from the LED lamp 12, for example reducing the power to the LED lamp 12 when ambient light conditions are high. This, for example, dims the LED lamp 12 if light from a nearby window is available, maintaining a desired lighting level while saving power. Other information may be transmitted from the LED lamp 12 to an external interface, including information such as RMS current, RMS voltage, power, power factor, wattage, etc. This information may further be gathered and provided to a user remotely via a web browser or internet based connection, either directly from the LED lamp 12 or from a central control system in a home or other location, allowing a user to control the LED lamp 12 when away from home and to verify that the LED lamp 12 is operating at the desired level by viewing the power consumed by the LED lamp 12, for example.

As mentioned above, the present invention can accept dimming signals from a number of sources including dimmers inserted into the AC line supply such as conventional wall dimmers or an analog voltage or a digital voltage whether transmitted using wires or sent wireless. An inventive feature of the present invention is the ability to select only the desired dimming sources at a particular time and being able to deselect/tune out the unwanted ones at a particular time, moment or point. This select/deselect process can be totally under the user's control or automatically selected or a combination of both. As an example, wall dimming can be deselected by switching the LED power supply, driver, and/or associated power management electronics from a wall dimming responsive mode to a universal voltage mode. As long as the wall dimming signal is not too low or turned off, the selected universal nature of the power supply, driver, power management system will take over and provide constant performance from the LED and or LED array which can then be dimmed by other means including analog, digital, PWM, phase dimming, amplitude dimming, etc.

The LED lamp 12 and/or recessed light fixture may include a microphone for voice recognition, emergency response, musical color coordination, the ability to communicate between lights and other systems, and other such applications. For example, the system may be adapted to respond to voice commands to turn on and off, set the dimming levels, and/or control the output color. The system may be adapted to respond to emergency commands such as "fire", and to have a programmable response to such a command. For example, the system may be programmed to flash the light on and off with a red color and to cause other linked lights to do so as well. The system may be programmed to return to a solid bright white output after a predetermined period of time to illuminate exits during an emergency. The system may be adapted with musical color coordination, for example, in response to a voice command such as "music", and thereafter to vary the color and pulsate the light levels in response to ambient music from any suitable source as detected by the microphone or by any other suitable input including digital music input into the present invention. The system may be adapted to synchronize the state of multiple LED lamps 12 and/or recessed light fixtures. One of them may be configured as the master device and the others as slave devices to quickly and easily control multiple devices.

The invention discussed here may also incorporate one or more temperature sensing devices that can be used to monitor and control the LEDs for numerous applications including but not limited to over-temperature control and response of the LED power supply, driver, and related circuits and electronics, measurement, monitor and control, etc. of the LED light source whether the LED light source be a single LED unit or any other combination of LEDs arrayed together in any type and form of, for example, a two dimensional or three dimensional format, structure, pattern, etc. Such control can range from gradual reduction in light intensity to abrupt and complete turn-off depending on the temperature for example, the rate of temperature rise, the temperature profile, the instantaneous temperature, the maximum temperature reached, the average temperature, the ambient temperature, the heat sink temperature, the LED temperature, the power supply and/or driver temperature, and any other single or combination of events or information, whether directly from the present light source or communicated to the light source in any way or form including by wired or wireless methods and approaches, etc. In addition, information about/regarding the temperature of the present invention may be communicated/transmitted to other parts of the system by any number of forms including those involving wireless, wired and optical methods. Such information may be used for numerous and diverse uses and applications including monitoring and control purposes, decision-making purposes, internal and external response purposes, derating, decreasing, power reduction, etc. decision, modifications, alerts, etc. In addition to temperature information, information about the input and output to the LED circuitry, including but not limited to, for example, input voltage, current, power, apparent power, power factor, phase, etc. and output voltage, current, waveforms, duty cycle, etc. may also be transmitted and communicated without limitation.

Figure 4:
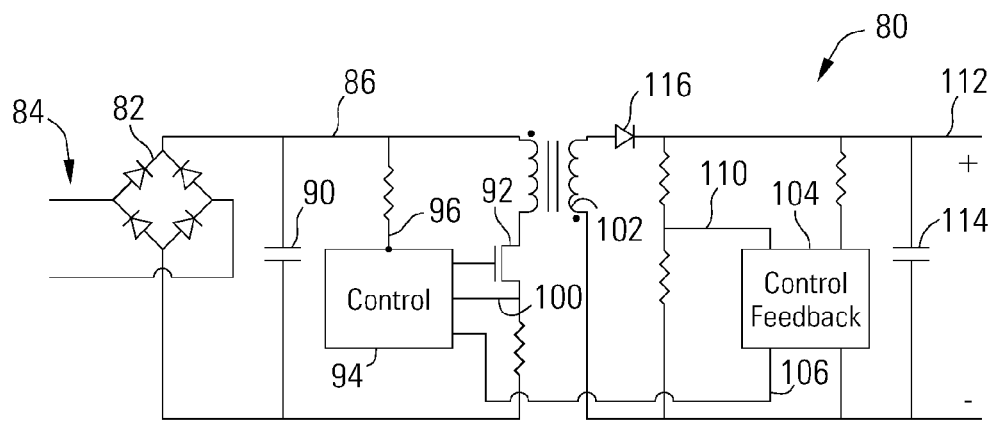
FIG. 4 depicts a power supply that may be used to power one or more or all channel(s) of an LED lamp, with common primary and secondary ground.

An example of a single channel power supply 80 that may be used in an LED lamp 12 is illustrated in FIG. 4. Note that the supply 80 may be adapted or duplicated to drive multiple channels in a multi-color system or for other uses depending on the application. Further note that a single power supply may be used to driver all of the blended color channels. In addition, a single power supply may be configured to drive some but not all of the LED color channels. A diode bridge 82 rectifies an alternating current (AC) input 84 to produce a direct current (DC) supply 86. The rectified DC supply 86 may be filtered and conditioned if desired by a capacitor 90 and/or other filtering components. A switch 92 is placed in series in the DC supply line 86 to control and regulate the input power, under the control of a switch controller 94. The control scheme implemented by the switch controller 94 may be any of a number of suitable schemes, such as pulse width modulation, fixed or variable frequency, fixed or variable on time, fixed or variable off time, resonant mode, discontinuous current/conduction mode, continuous conduction/current mode, critical conduction/current mode, etc. Circuit configurations may include, but are certainly not limited to, buck, boost, buck-boost, boost-buck, resonant, CUK, SEPIC, etc. or combinations of these and other types of circuit configurations and architectures, etc. Dither and other techniques and components may also be used to assist in, for example, electromagnetic interference (EMI) reduction and electromagnetic compliance (EMC) acceptance. The switch controller 94 may use a voltage reference signal 96 and a current reference signal 100 to monitor the input voltage and current as it controls the switch 92. A transformer 102 may be used in this example power supply to provide isolation and voltage level scaling between the input side and output side of the supply 80 if desired. The transformer 102 can be used in any configuration including, as an example, flyback. In some embodiments, an inductor can be used instead of a transformer. A feedback controller 104 produces a feedback and control signal 106, which may be based on a reference voltage signal 110 as a scaled version of the voltage at the output 112 to produce a constant voltage at the output 112. The feedback controller 104 may include a dimming circuit to scale the feedback and control signal 106 and/or the reference signals (e.g., 110). The switch controller 94 controls the switch 92 based at least in part on the feedback and control signal 106 to maintain the appropriate current level at the output 112 to produce the desired intensity level of one or more LEDs connected to the output 112. A capacitor 114 may be used to filter the output 112 if desired.

The transformer 102 may be configured to operate in conjunction with diode 116 as a flyback converter. When the switch 92 is on, the primary of the transformer 102 is directly connected to the DC supply 86. This results in an increase of magnetic flux in the transformer 102. The voltage across the secondary winding is negative, so the diode 116 is reverse-biased or blocked. The output capacitor 114 supplies energy to the output 112. When the switch 92 is off, the energy stored in the transformer 102 is transferred to the output 112.

Figure 5:
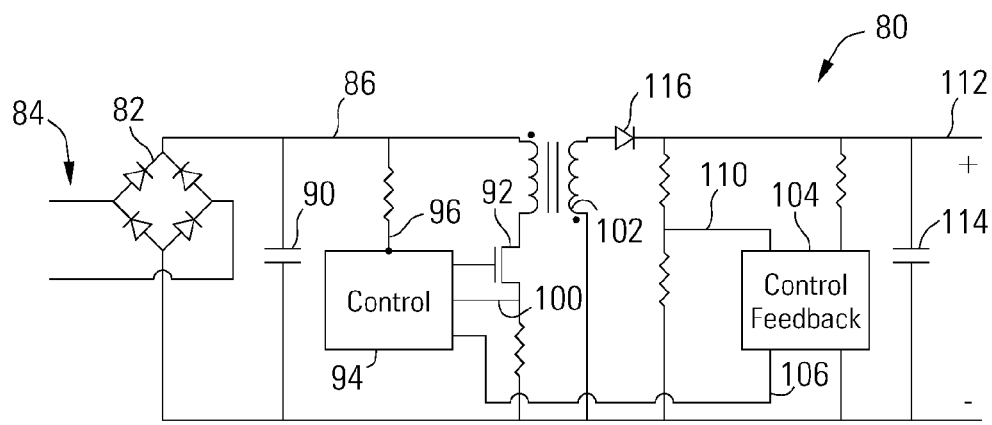
FIG. 5 depicts a power supply that may be used to power one or more or all channel(s) of an LED lamp, with floating secondary.

The primary and secondary sides of the supply 80 may be isolated as in FIG. 4, with the feedback and control signal 106 either directly connected between the feedback controller 104 and the switch controller 94, or isolated using any suitable isolation device such as an opto-coupler, opto-isolator, level shifting transistor, etc. In other embodiments, the primary and secondary sides of the supply 80 may share a common ground as in FIG. 5, with the feedback and control signal 106 either directly connected between the feedback controller 104 and the switch controller 94, or isolated using any suitable isolation device such as an opto-coupler, opto-isolator, level shifting transistor(s), level shifting ICs, etc.

Figure 6:
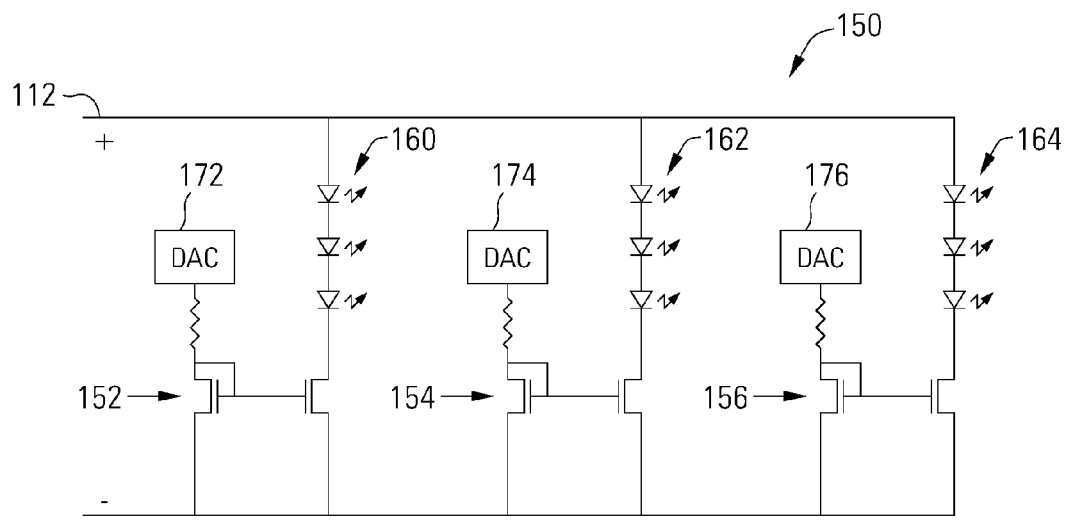
FIG. 6 depicts a controller using current mirrors that may be used to adjust current levels through three groups of LEDs.
Figure 7:
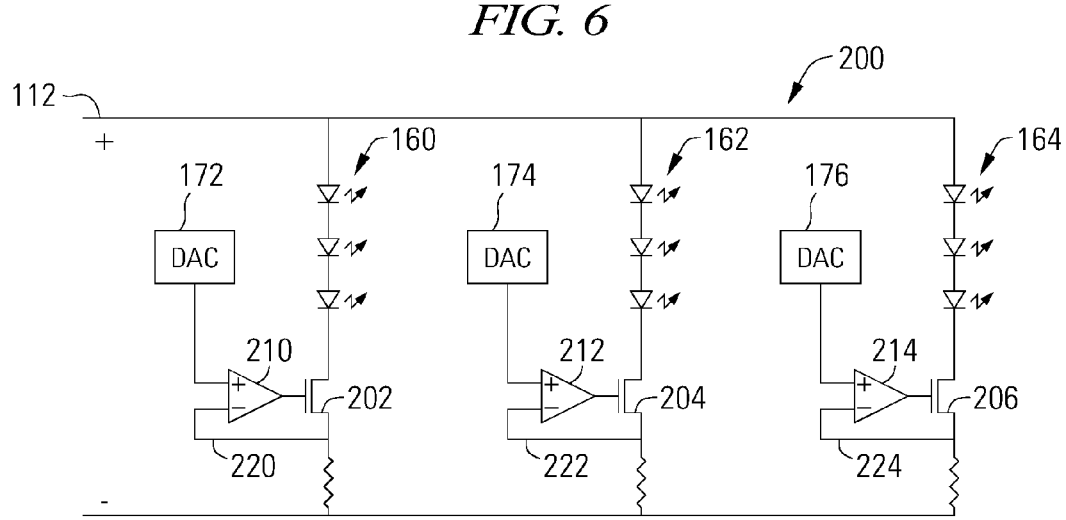
FIG. 7 depicts a controller using operational amplifiers or, for example, alternatively comparators that may be used to adjust current levels through three groups of LEDs.
Figure 8:
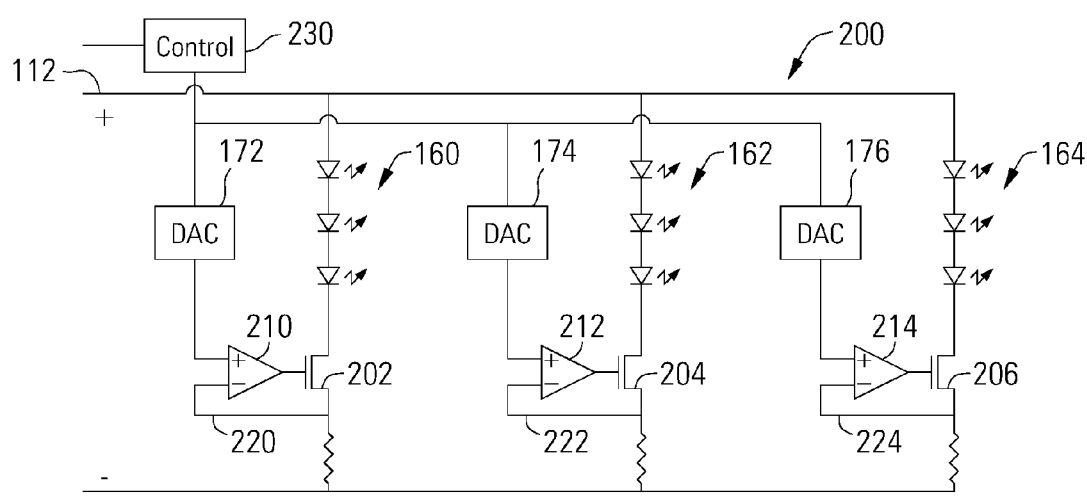
FIG. 8 depicts a controller using operational amplifiers or, for example, alternatively comparators with external control signal(s) that may be used to adjust current levels through, for example, three groups of LEDs.
Figure 9:
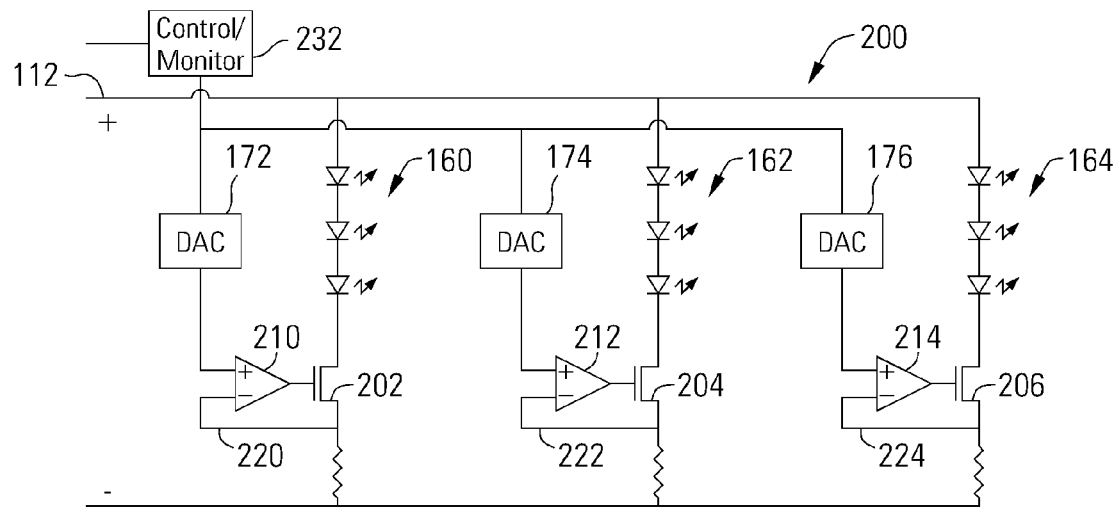
FIG. 9 depicts a controller using comparators with external control signal and status feedback that may be used to adjust current levels through three groups of LEDs.

An example of a controller 150 using current mirrors 152, 154 and 156 that may be used to adjust current levels through three groups of LEDs 160, 162 and 164 is illustrated in FIG. 6. The constant voltage DC supply line 112 from the supply 80 is used to power the LEDs 160, 162 and 164. In this embodiment, the current through each group of LEDs 160, 162 and 164 is controlled by the current mirrors 152, 154 and 156, each based on a digital to analog converter (DAC) 172, 174 and 176. As illustrated in FIG. 7, the current control may be performed in another controller 200 using analog switches 202, 204 and 206 adjusted by operational amplifiers or, as another example, comparators 210, 212 and 214 that compare current feedback signals 220, 222 and 224 with the signals from the DACs 172, 174 and 176. As illustrated in FIG. 8, the DACs 172, 174 and 176 may be controlled by a control circuit 230 that generates control information/bytes/words to the DACs 172, 174 and 176 to set the load currents based on factors such as a user selected color, user selected dimming level input, ambient light, input from a temperature sensor and/or microphone, etc. As illustrated in FIG. 9, the control circuit may be replaced with a control/monitor circuit 232 that provides feedback to the user in any suitable manner, such as at a display on a remote control, or on a web server, etc. The status provided by the control/monitor circuit 232 may include color, intensity level, voltage, current, real and apparent power, power factor, etc. Additional "pages" on the display or the controller, for example, can be used to set the color including for blended applications CRI and CCT, set individual levels and intensities of each of the blended colors which can then be saved as new user defined colors or color matched to existing colors on the display of the controller. Dimming levels and sequences can be set and, for example, programmed for the present invention. Color and intensity sequences can be programmed in some configurations of the present invention so as to repeat a desired sequence or blended color and dimming/intensity levels or to, for example, randomize the color of the present invention. In other configurations this sequencing and/or randomizing can be downloaded or already built-in to the LED lamp of the present invention.

Figure 10:
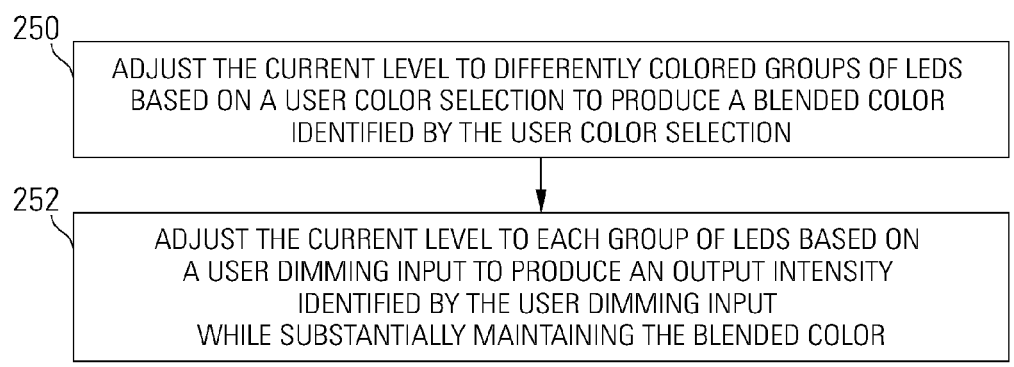
FIG. 10 is a flow chart of an example operation to control an LED lamp.

A method of controlling an LED lamp is outlined in the flow chart of FIG. 10. The current level to each of a number of differently colored groups of LEDs is adjusted based on a user color selection to produce a blended color identified by the user color selection. (Block 250) The current level to each of the groups is also adjusted based on a user dimming input to produce an output intensity identified by the user dimming input while substantially maintaining the blended color. (Block 252) Note that each of the groups can contain one or more LEDs, with either homogeneous colors or heterogeneous colors of LEDs in each group as desired.

A number of control and monitoring implementations can be used in the present invention including those based on analog and digital circuits and interfacing, microcontrollers, microprocessors, application specific integrated circuits (ASICs), field programmable gate arrays (FPGAs) and related or similar functional devices including, for example, complex logic devices (CLDs), digital logic, state machines, etc. As an example, a microcontroller with built-in DACs can be used to set the individual current levels for each of the blended colors in the present invention. Such a microcontroller could also be wireless and/or wired depending on the details of, for example, a particular application.

While illustrative embodiments have been described in detail herein, it is to be understood that the concepts disclosed herein may be otherwise variously embodied and employed.

What is claimed is:

1. A lighting apparatus comprising:
at least one LED in each of a plurality of colors;
a power supply; and
a controller connected to the power supply and the at least one LED in each of a plurality of colors, wherein the controller is adapted to adjust current levels to the at least one LED in each of the plurality of colors to produce a blended color, and wherein the controller is adapted to adjustably vary an intensity of the blended color without substantially changing the blended color, and wherein the controller is adapted to transmit a status of the current level to the at least one LED in each of the plurality of colors to an external controller for user display; and wherein the controller is adapted to selectably accept dimming signals from a plurality of sources and to selectably deselect ones of the dimming signals, wherein the controller is adapted to automatically select among the dimming signals, and wherein the controller is adapted to deselect wall dimming when the power supply is switched to a universal voltage mode.

2. The lighting apparatus of claim 1, further comprising a wireless transceiver, wherein the controller is adapted to receive a user color selection and a user dimming level selection through the wireless transceiver, wherein the blended color is based on the user color selection and the intensity is based on the user dimming level selection.

3. The lighting apparatus of claim 2, wherein the controller is further adapted to vary the intensity based on a power level to the power supply as set by an external dimmer.

4. The lighting apparatus of claim 1, wherein the power supply comprises an AC/DC converter adapted to convert an AC line voltage to a lower voltage constant current DC output.

5. The lighting apparatus of claim 1, wherein the blended color is maintained during intensity adjustment by substantially maintaining a ratio between the current levels to the at least one LED in each of the plurality of colors.

6. The lighting apparatus of claim 1, further comprising at least one light sensor, wherein the blended color is maintained during intensity adjustment based on feedback from the at least one light sensor.

7. The lighting apparatus of claim 1, further comprising at least one light sensor, wherein the controller is adapted to vary the intensity based at least in part on a measurement from the at least one light sensor to maintain a user selected illumination level.

8. The lighting apparatus of claim 1, further comprising a microphone, wherein the controller is adapted to receive audio input from the microphone and wherein the blended color and the intensity are based at least in part on the audio input.

9. The lighting apparatus of claim 1, further comprising a temperature sensor, wherein the controller is adapted to receive temperature data from the temperature sensor and wherein the blended color and the intensity are based at least in part on the temperature data.

10. The lighting apparatus of claim 1, wherein the controller is adapted to operate in cooperation with other lighting apparatuses, each of the other lighting apparatuses comprising at least one LED in each of a plurality of colors, a power supply, and a controller connected to the power supply and the at least one LED.

11. The lighting apparatus of claim 1, wherein the controller is adapted to select among the dimming signals under user control.

12. The lighting apparatus of claim 1, wherein the controller is adapted to operate in emergency mode with a color change in the at least one LED and with the at least one LED flashing.

13. The lighting apparatus of claim 12, wherein the controller is adapted to cause other linked lights to operate in the emergency mode.

14. The lighting apparatus of claim 12, wherein the controller is adapted to return to a non-flashing operation from the emergency mode after a predetermined period of time.

15. A method of controlling an LED lamp, the method comprising:
selectably accepting user color selections from a plurality of sources and deselecting user color selections from ones of the plurality of sources;
automatically selecting and deselecting dimming signals from a plurality of dimming sources and deselecting a wall dimming source when operating in a universal voltage mode;
adjusting a current level to each of a plurality of groups of LEDs based on a user color selection, wherein each of the plurality of groups of LEDs has a different color, to produce a blended color identified by the user color selection;
adjusting the current level to each of the plurality of groups of LEDs based on a user dimming input to produce an output intensity identified by the user dimming input while substantially maintaining the blended color; and
transmitting a status of the current level to each of the plurality of groups of LEDs to an external controller for user display.

16. The method of claim 15, further comprising receiving the user color selection and the user dimming input from a wireless remote control.

17. The method of claim 15, further comprising receiving the user color selection and the user dimming input over a power line data link.

18. The method of claim 15, further comprising transmitting a status of the current level to each of the plurality of groups of LEDs to a remote interface.

* * * * *